2,791,565

LUMINESCENT ALKALINE EARTH OXIDES

William A. Runciman, Harrow Weald, England, assignor to General Electric Company, a corporation of New York No Drawing. Application April 30, 1954,
Serial No. 426,916

Claims priority, application Great Britain May 8, 1953

6 Claims. (Cl. 252—301.4)

This invention relates to luminescent materials comprising alkaline earth metal oxides with activators.

It is known that calcium oxide is activated by uranium to luminescence under excitation by radiations of wavelength 3650 A. It is also known that alkaline earth metal oxides are activated by the addition of certain members of the rare earth group of elements.

It is an object of the present invention to provide luminescent materials which consist essentially of activated alkaline earth metal oxides, and which exhibit luminescence of improved intensity as compared with that shown by the previously known alkaline earth metal oxide luminescent materials.

According to the invention, a luminescent material consists of or includes an alkaline earth metal oxide activated by both uranium and one or more of the rare earth elements, so as to be excitable to luminescence by ultra-violet radiation of wavelength 3650 A.

The term "alkaline earth metal," as used herein, is to be understood to include only the metals calcium, strontium and barium.

The rare earth elements employed as activators in the luminescent materials according to the invention may be divided into two classes with reference to their effect on the luminescence exhibited by these materials. Thus, some of the rare earth elements, which will be referred to as the first class, may be regarded as intensifiers of the luminescence due to the uranium, since the color of the luminescence shown by materials containing these elements is the green characteristic of uranium, with little or no modification, the lines or bands in the emission spectra of these materials appearing in the same part of the spectrum as the uranium lines or bands, but usually, especially at low temperatures, being of greater intensity than is the case with alkaline earth metal oxides activated by uranium alone. Examples of rare earth elements belonging to this first class are gadolinium and lanthanum.

On the other hand, in the cases of materials activated by rare earth elements of the second class, examples of which are europium and samarium, the luminescence is of substantially the same color as that shown by a luminescent material consisting, in each case, of the same alkaline earth metal oxide activated by the same rare earth element alone, without the addition of uranium. However, the intensity of the luminescence obtained with the materials of the present invention containing rare earth elements of the second class is greatly increased, as compared with that shown by the corresponding oxides activated by the rare earth elements alone, this increased intensity apparently being due to the presence of uranium. This increase in the intensity of the luminescence is especially marked in cases where the amount of rare earth element present in the material is small. Furthermore, when the proportion of rare earth element (of the second class) present is extremely small, for example below $10^{-2}$ mol percent, the color of luminescence characteristic of uranium may be apparent in addition to that characteristic of the rare earth element.

The proportion of uranium employed in the luminescent materials of the invention may be within the range of $10^{-2}$ to 25 mol percent, and the proportion of the rare earth element employed may be within the range of $10^{-6}$ to 5 mol percent. The optimum proportions are about 1 mol percent of uranium, about 1 mol percent of a rare earth element of the first class and about 0.1 mol percent of a rare earth element of the second class.

The intensity of the luminescence shown by the materials of this invention increases with decreasing temperature below room temperature, and is greatest at very low temperatures, for example at the temperature of liquid air, that is to say $-180°$ C. Furthermore, in some cases there is a change in the color of the emission with decreasing temperature. We have also found that in materials containing small concentrations of rare earth activator, the temperature dependencies of the luminescence due to the rare earth element, and that due to the uranium, are different, so that the color of the emission will vary according to temperature: it is therefore possible that such luminescent materials may find a use as temperature indicators in the range of temperatures from room temperature to $-180°$ C., or even lower temperatures.

The alkaline earth metal oxides, activated by uranium and a rare earth element, are in some cases excitable to luminescence by ultraviolet radiation of wavelength 2537 A. and/or by X-rays, especially at low temperatures; such luminescence, however, when it occurs, is usually considerably weaker than that produced by excitation by the 3650 A. radiation.

Luminescent materials within the scope of the present invention may consist of mixtures of two or more alkaline earth metal oxides activated by uranium and one or more rare earth elements.

A luminescent material in accordance with the present invention may be prepared by heating the appropriate alkaline earth metal oxide, or a compound capable of decomposing when heated to form the oxide, with uranium trioxide, $UO_3$, or a compound containing the uranyl group ($UO_2$), and one or more suitable rare earth compounds. Uranium trioxide may be mixed in the dried state with the algaline earth metal compound, or an aqueous solution of a uranyl compound, such as the nitrate, may be mixed with the alkaline earth metal compound to form a paste. The rare earth elements may be added to the mixture either in the form of the oxides in the dry state, or in the form of aqueous solutions of salts, such as the nitrates. The mixture, if necessary after drying, is heated at a temperature in the range of 1100–1350° C., at least a part of the heating preferably being carried out above 1200° C.

The raw materials used in the preparation of the luminescent materials of the invention should be of a high degree of purity, as is usual in the manufacture of luminescent materials.

The preparation of some specific materials in accordance with the invention will now be described by way of example.

Example 1

For the preparation of a luminescent material consisting of calcium oxide activated by approximately 1 mol percent of uranium and 0.1 mol percent of samarium, 5.00 grams of calcium carbonate is made into a paste with 2.50 cc. of an aqueous solution containing 0.25 gram of uranyl nitrate, and 7.5 cc. of an aqueous solution of samarium nitrate containing 0.1 percent by weight of samarium. The paste is dried at 250° C., the dried material is ground, and the resulting powder is heated in air for one hour at 1150° C., ground and reheated for an hour at 1250° C. The product thus obtained shows luminescence of an orange color under excitation by ultraviolet radiation of wavelength 3650 A. at both room temperature and −180° C., the intensity of the luminescence being considerably greater at the lower temperature. This material is also excited to weak orange luminescence by X-rays at −180° C.

*Example 2*

For the preparation of a luminescent material consisting of calcium oxide activated by approximately 1 mol percent of uranium and 1 mol percent of gadolinium, 5.00 grams of calcium carbonate is made into a paste with an aqueous solution containing 0.25 grams of uranyl nitrate, and 7.5 cc. of an aqueous solution of gadolinium nitrate containing 1 percent by weight of gadolinium. The paste is dried at 250° C., and the dried material is ground and heated in air for one hour at 1250° C. The powder thus obtained shows green luminescence under excitation by ultraviolet radiation of wavelength 3650 A. at both room temperature and −180° C., the intensity of the luminescence being considerably greater at the lower temperature.

*Example 3*

Calcium oxide activated by 1 mol percent of uranium and 0.1 mol percent of europium is prepared as in Example 1 by substitution of an equivalent amount of europium nitrate for the samarium nitrate.

*Example 4*

Calcium oxide activated by 1 mol percent of uranium and 1 mol percent of lanthanum is prepared as in Example 2 by substitution of an equivalent amount of lanthanum nitrate for the gadolinium nitrate.

Phosphors of barium oxide or strontium oxide or mixtures thereof with calcium oxide are prepared by substituting carbonate of barium or strontium, in whole or in part, for the calcium carbonate in any of the above examples.

When a high proportion, for example 1 mol percent or more, of a uranium compound is employed in the preparation of luminescent materials in accordance with the invention, some of the uranium compound may react with some of the alkaline earth metal oxide to form an alkaline earth metal uranate of the general formula $R_3UO_6$. In such a case the product obtained may consist of a mixture of an alkaline earth metal oxide activated by uranium and one or more rare earth elements, and an alkaline earth metal uranate activated by one or more rare earth elements.

What I claim as new and desire to secure by Letters Patent of the United States is:

1. A luminescent material consisting essentially of an alkaline earth oxide activated by about $10^{-2}$ to 25 mol percent of uranium and $10^{-6}$ to 5 mol percent of a rare earth element from the class consisting of gadolinium, lanthanum, europium and samarium.

2. A luminescent material consisting essentially of calcium oxide activated by about $10^{-2}$ to 25 mol percent of uranium and $10^{-6}$ to 5 mol percent of a rare earth element from the class consisting of gadolinium, lanthanum, europium and samarium.

3. A luminescent material consisting essentially of calcium oxide activated by about 1 mol percent of uranium and about 1 mol percent of gadolinium.

4. A luminescent material consisting essentially of calcium oxide activated by about 1 mol percent of uranium and about 1 mol percent of lanthanum.

5. A luminescent material consisting essentially of calcium oxide activated by about 1 mol percent of uranium and about 0.1 mol percent of europium.

6. A luminescent material consisting essentially of calcium oxide activated by about 1 mol percent of uranium and about 0.1 mol percent of samarium.

References Cited in the file of this patent

FOREIGN PATENTS

| | | |
|---|---|---|
| 543,664 | Great Britain | Mar. 6, 1942 |
| 984,253 | France | July 4, 1951 |